Jan. 19, 1960     K. C. ALLEN     2,921,780
WEIGHING SCALES
Filed Feb. 1, 1957          2 Sheets-Sheet 2
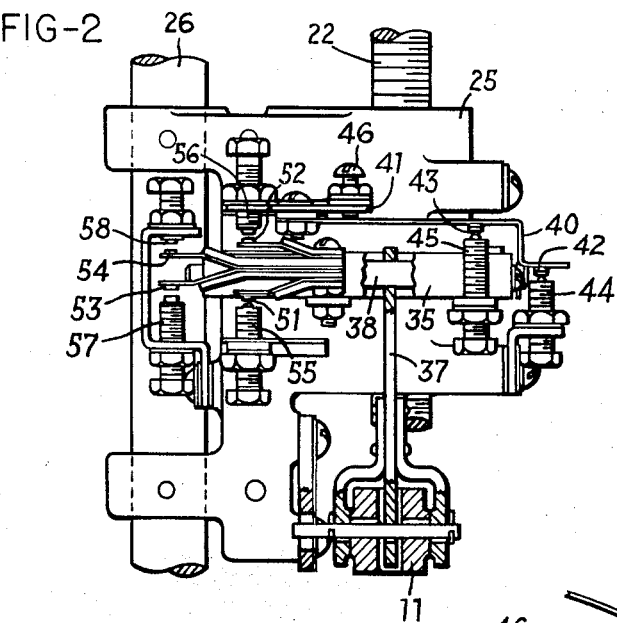
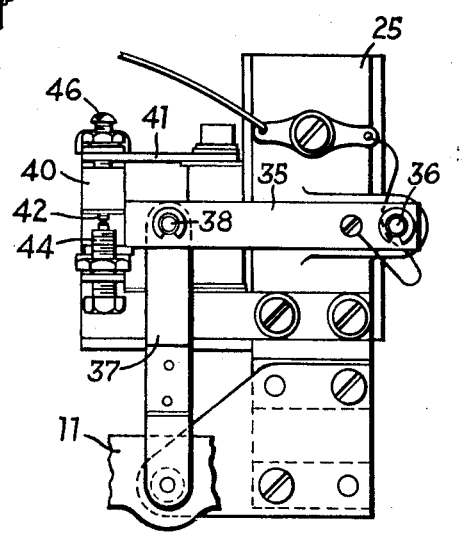
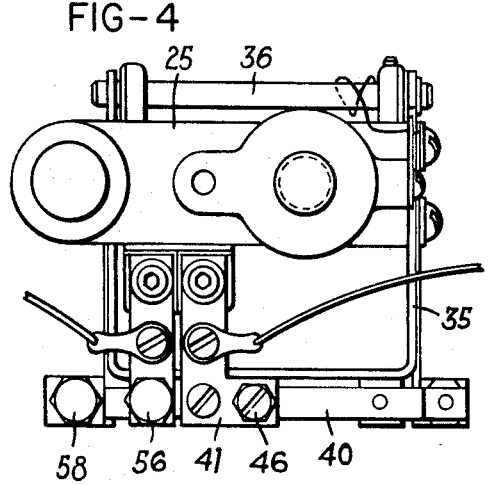
INVENTOR
KENNETH C. ALLEN
BY
*Marechal, Biebel, French & Bugg*
ATTORNEYS

United States Patent Office 2,921,780
Patented Jan. 19, 1960

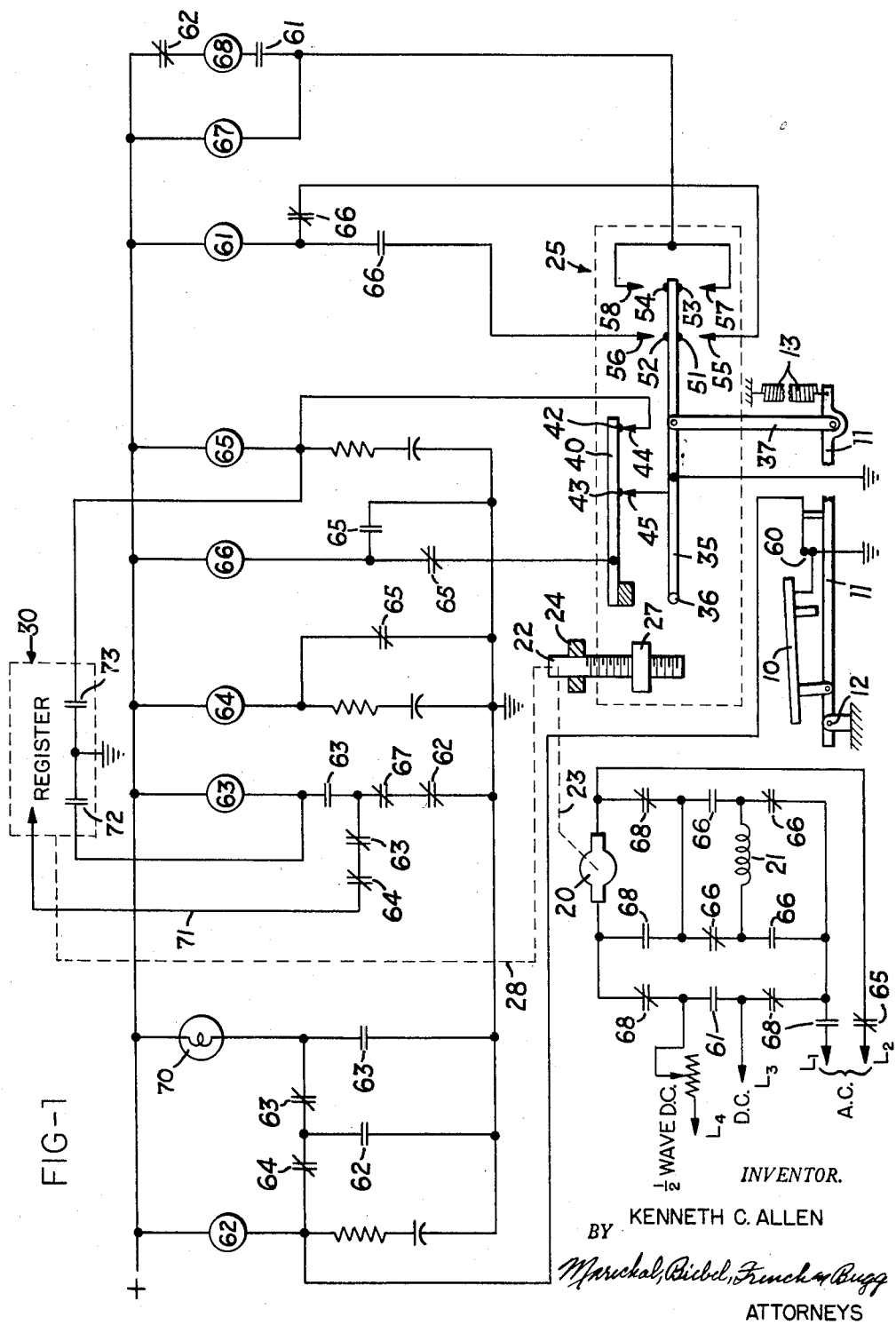

2,921,780

WEIGHING SCALES

Kenneth C. Allen, Dayton, Ohio, assignor to The Hobart Manufacturing Company, Troy, Ohio, a corporation of Ohio Application February 1, 1957, Serial No. 637,756

7 Claims. (Cl. 265—70)

This invention relates to weighing scales and weighing systems.

The invention has particular relation to power operated weighing systems of the type wherein the weighing movements of the weighing mechanism are sensed by a control which actuates a power operated device which in turn transmits information with respect to the balance position of the scale to a register. Thus the invention is especially adapted for combination in a power operated weighing system which incorporates apparatus for computing the value of successive weighed articles and for issuing printed tickets identifying the weight, the unit price, and the value of the articles. Such a system is particularly useful in food stores for prepackaging operations wherein a series of successive packages or articles of food commodities are weighed and then labeled with a printed ticket identifying the commodity together with its weight, unit price and value, and one such system is disclosed in copending application of Kenneth C. Allen, Serial No. 637,725 filed of even date herewith and referred to hereinafter as Case A.

In a weighing and packaging operation of the above type, it is important to provide for maximum speed while still giving maximum assurance against error at every stage of the operation, so that each successive package or other article will be properly identified by its own printed label or other ticket and that the information appearing on each such ticket be accurate in every respect. One way in which achievement of this broad objective may be aided is by control of the power operated weighing mechanism in such manner that it will not completely return to its zero position between closely spaced consecutive weighing operations but will instead remain near its previous balance position. This reduces unnecessary working of the power mechanism and also minimizes the time required for the next weighing operation, and the present invention is especially concerned with this phase of powered scale operation.

It is a primary object of the present invention to provide a power operated scale which will quickly and accurately reach a balance position by traveling for the major portion of its movement at high speed followed by a final movement at low speed to minimize the possibility of over-travel, and which will return from its balance position at low speed following removal of the load therefrom in order to minimize the necessary movement to a new balance position when a new load is applied thereto. In the embodiment of the invention described hereinafter, when a load is applied to the scale, the sensing mechanism of the scale causes it to travel at high speed to a position relatively near balance and then drop to a very much lower medium speed until it is within a few hundredths of a pound of the balance position. At this point, it drops to a still lower slow speed for the remainder of its movement to balance. When the computing action for this weighing operation is completed and the load is removed from the scale, the sensing mechanism immediately causes the scale to start to return to its zero position, but its movement is at the relatively low medium speed. Then if a new load is placed on the platter, the scale immediately starts to move to the proper new balance position at high speed, and irrespective of whether this movement be toward or away from its zero position, thus avoiding loss of time and unnecessary working of the mechanism which would occur if its initial return movement had been at high speed.

It is an object of the present invention to provide a power operated scale having an electric control system which will automatically produce the above operating sequence, and additional objects and advantages of the invention will be apparent from the following description, the accompanying drawing and the appended claims.

In the drawing—

Fig. 1 is a somewhat schematic wiring diagram incorporating a control system in accordance with the invention for a power operated scale;

Fig. 2 is a fragmentary view looking from left to right in Fig. 3 with some parts broken away and showing the position sensing mechanism of the scale of Fig. 1;

Fig. 3 is a side elevation looking from right to left in Fig. 2; and

Fig. 4 is a plan view of the parts shown in Figs. 2 and 3.

Referring to the drawings, which illustrate a preferred embodiment of the invention, a wiring diagram including some essential elements of a power operated scale indicated diagrammatically is shown in Fig. 1, and parts of the position sensing mechanism of the scale are shown in detail in Figs. 2–4. The platter 10 for receiving the article to be weighed is mounted on the main scale lever 11 which is pivotally mounted at 12 for deflection against the counterbalancing spring 13, and control mechanism is provided for sensing the movements of the lever 11 to its balance position. The power operating means is represented fragmentarily in Fig. 1 by a motor comprising an armature 20 and field windings 21 which is connected to drive a lead screw 22 as indicated diagrammatically at 23, the lead screw having a journaled mounting 24 on the main frame of the scale.

The lead screw 22 drives a follow-up carriage 25 mounted for vertical movement on the main frame of the scale as indicated by the guide rod 26 in Figs. 2–4 and represented by the dotted outline 25 in Fig. 1, the carriage having a nut 27 therein which provides the driving connection with the lead screw 22. The angular position of the lead screw during each operation is read out as indicated diagrammatically at 28 by means of a suitable register mechanism 30, such as is described in detail in the above noted copending application, which thus records the weight of the load, computes the price of the weighed load and issues a printed ticket or label bearing this information and the weight of the load.

Referring now to Figs. 2–4, the carriage 25 has a U-shaped arm 35 pivotally mounted thereon by the pin 36 and connected by means of a link 37 and pin 38 with the main scale lever 11 for movement with respect to the carriage in response to the weighing movements of the lever. A spring contact arm 40 is secured on the carriage 25 by an insulated bracket 41 and carries a pair of contacts 42 and 43. The contact 42 is located for engagement with an adjustable contact 44 having an insulated mounting on the carriage 25, and the contact 43 similarly engages an adjustable contact 45 mounted on the arm 35. An adjusting screw 46 on the carriage provides for regulating the tension of the spring arm 40 so that when the scale lever 11 is in balance position, these two sets of contacts will both be closed.

The arm 35 also carries two pairs of additional spring contacts 51—52 and 53—54 for cooperation with similar pairs of adjustable contacts 55—56 and 57—58 on the carriage 25 which are connected together respectively and are provided with insulated mountings on the carriage. In the balance position of the scale lever 11, all four of these sets of contacts are out of engagement, and it will also be noted that when arm 35 moves away from its central position, the spring contact 51 or 52 will first engage its cooperating fixed contact on the carriage, and a further deflecting movement of arm 35 will cause the spring contact 53 or 54 to engage its fixed contact.

The wiring diagram in Fig. 1 illustrates the several relays and switches in the control circuits of the scale in the positions they occupy when the scale has been turned on by the main switch (not shown) but with no load on the platter 10. Thus the switch 60, which is the no-load switch, is closed as indicated diagrammatically, and the relay 62 is closed through switch 60 and is locked in through its own front contacts and the back contacts of relay 64. Similarly the switches 42—44 and 43—45 are closed to complete an energizing circuit to ground for relay 65, and relay 66 is closed through the closed front contacts of relay 65. The remaining relays 61, 63, 64, 67 and 68 are open, and the signal light 70 is energized through the closed front contacts of relay 62 and back contacts of relay 63 to show that the scale is ready to weigh. The motor 20—21 is therefore deenergized, and the lead screw 22 will occupy its reference position corresponding to the zero position of the lever 11.

When a load is placed on the platter 10, the resulting relative movement of the platter 10 and the main lever 11 immediately opens no-load switch 60, and lever 11 starts down from its zero position. Switch 43—45 also opens immediately, but switch 42—44 remains closed. Opening of switch 43—45 causes relay 65 to open after a fractional second delay due to the condenser and resistor in its direct connection to ground, and opening of relay 65 causes relay 66 to open and relay 64 to close through the back contacts of relay 65. This in turn will cause relay 62 to open after a short delay caused by the condenser and resistor in its connection to ground, and the resulting opening of the locking front contacts of relay 62 will cause the signal light 70 to go out.

The continued movement of arm 35 in response to the movement of the scale lever then almost immediately causes switches 51—55 and 53—57 to close in that sequence. Relay 61 will therefore then close through switch 51—55 and the back contacts of relay 66, and similarly relay 67 will close through switch 53—57. At the same time, relay 68 will close through the now closed front contacts of relay 61 and the back contacts of relay 62. The maximum deflecting movement of arm 35, and hence of lever 11, with respect to carriage 25 is established by the pin 80 which is carried by the lever 11 as shown in Fig. 2 and projects at one side of the lever into a slot 81 in bracket 82 secured to the carriage 25, thus preventing the possibility of unduly bending any of the several contact arms.

When this sequence of the opening and closing of relays and switches has been completed, a circuit is established for causing high speed operation of the scale motor 20—21. This circuit runs directly to the 110 volt A.C. lines L–1 and L–2 through the back contacts of relay 65 and the closed front contacts of relay 68. The proper direction of rotation of the motor is established by the position of the relay 66, and in this instance the motor will drive the lead screw 22 in the proper direction to cause carriage 25 to move downwardly for the purpose of sensing the balance position of the lever 11 after it has stopped moving downwardly under the applied load on the platter.

This high speed operation of the motor will continue until the carriage 25 has reached a position such that the switch 53—57 opens, and the contacts 57 and 58 are preferably so adjusted that this condition is established when the lead screw 22 has been brought to a position relatively close to the proper balance weight, for example .30 pound. Thus Case A describes a scale wherein the lead screw makes 1⅔ revolutions for each pound, so that the switch 53—57 opens when the lead screw is within one-half revolution of its balance position. At this point, both of relays 67 and 68 open, and this shifts the power supply for the motor from the high speed A.C. circuit and establishes a shunt circuit to the lines L–2 and L–3 providing 20 volt D.C. This reduces the motor to the medium speed condition which in fact is very much lower than high speed.

The motor continues to run at medium speed until the switch 51—55 opens, and the contacts 55 and 56 are preferably so adjusted that this takes place when the register mechanism is very close to balance, for example .03 pound. At this point, relay 61 opens, and the armature circuit is therefore shifted to a half-wave D.C. circuit through the lines L–2 and L–4 to establish slow speed operation until the balance position of the mechanism is established by closing of switch 43—45. In a satisfactory embodiment of the invention, the ratio of the three speeds is 100:5:1, thereby providing for rapid operation with minimum likelihood of overtravel of the lead screw beyond the balance position, and what has been termed medium speed is therefore effectively low speed with relation to the high speed rate of operation.

At the balance position, the closing of switch 43—45 will reestablish the energizing circuits for relays 65 and 66. When relay 65 closes, it shuts off the motor by breaking line L–2 at the back contacts of relay 65, and it also establishes a holding circuit for relay 66. Relay 64 will then open after the short time delay established by the condenser and resistor in its connection to ground to assure that the scale will be accurately in balance before subsequent operations take place.

Opening of relay 64 applies a ground through its back contacts and the back contacts of relays 62, 67 and 63 to the line 71 leading to the register 30, and this initiates the computing operation of the mechanism as described in Case A. As also described in that application, operation of the computer temporarily closes the relay contacts 72 to complete an energizing circuit for relay 63, which closes and locks itself in through the back contacts of relays 62 and 67 to break the ground connection for line 71 and thus prevent recycling of the register before another weighing operation. A ground is similarly applied by the closing of contacts 73 in the register 30 to the line 74 to hold relay 65 closed and thus to prevent the scale motor from running until relay 65 is released by the register when it has completed the read out of the weight.

When this point in the operating cycle has been reached, the light 70 is lighted through the front contacts of relay 63 to signal to the operator that the load can now be removed from the platter for replacement by a new load. If the load is removed completely, the platter 10 will immediately return to its no-load position and close switch 60. At the same time, the lever 11 will move upward, and the arm 35 will open switch 42—44 while holding switch 43—45 closed, and will also close switches 52—56 and 54—58. Relay 62 will close, and relay 67 will close and therefore break the holding circuit for relay 63. Signal light 70 will however be immediately re-lighted through the back contacts of relay 63 and the closed front contacts of relay 62.

As soon as relay 65 is opened by the opening of the contacts 73 in the register, which will occur in a matter of about a second or less, relay 66 will tend to open but immediately be reclosed through the back contacts of relay 65, and relay 64 will similarly close through back contacts of relay 65. Relay 61 will close through the front contacts of relay 66 and the switch 52—56, and therefore when the back contacts of relay 65 in line L–2 close, the motor will start to operate in reverse direction from its previous direction, i.e. in the direction to return the carriage 25 to its zero reference position. However, since relay 62 remains closed through switch 60 even after its locking circuit through the back contacts of relay 64 has been opened, relay 68 cannot close, and the motor will therefore operate at medium speed until the lead screw is sufficiently close to its zero position to cause switch 54—58 to open and thereby to shift the motor to slow speed for the remainder of the travel to zero position.

If a new load is placed on the platter during this medium speed return movement, the switch 60 will immediately be opened, and sice relay 64 is still closed, relay 62 will drop out. Since relay 61 is also closed, relay 68 will then close and thus shift the motor to its high speed operating circuit previously described. The direction of movement of the motor will depend upon whether the new weight requires a balance position above or below the position of the lead screw at the instant when the load is applied. Thus if the load is of greater weight, the arm 35 will be pulled downwardly to open the switch 43—45 and thereby to open relay 66 and to reverse the current direction through the motor armature and field. Conversely, if the weight of the new load is less than indicated by the current position of the lead screw, the switch 43—45 will remain closed to hold in the relay 66 and thus maintain the same direction for the motor.

One special condition should be noted, which is the case where the new load requires a balance position so close to the position of the lead screw when such new weight is applied that neither of switches 53—57 or 54—58 will close. In that event, the relay 68 will not close, and the further movement of the motor will therefore be at medium speed unless or until the position is such that both of switches 51—55 and 52—56 are open to reduce the motor to slow speed.

If the new load is placed on the platter before the previously weighed load is removed, then the switch 60 will be prevented from closing and the relay 62 cannot close, but the switches 53—57 and 54—58 will close immediately and cause relays 67 and 68 to close. This will break the holding circuit for relay 63 and extinguish the signal light 70, and when the relay 65 is released by the computer, the motor will run in the direction determined by whether relay 66 is open or closed and at a speed determined by the difference in weight between the two loads. In other words, if such difference is sufficient to close one of switches 53—57 or 54—58 after the first load has been removed, the motor will run at high speed, and if the difference is less, the motor will run accordingly at medium speed or slow speed depending upon the extent of such difference.

This invention accordingly provides a power operated scale having distinctive advantages from the standpoint of both accuracy and speed of operation, as well as simplicity and reliability. When it is included in a weighing system as described in Case A, the speed of the entire operation, including the computing of price and the printing of the ticket or label, is such that packages can be weighed and labeled at a rate as high as 20 to 30 per minute, particularly when such packages average within a fraction of a pound of each other as in the case of a series of similar packages of ground meats, cheese, and the like. Furthermore, such speed of operation is obtained along with an accuracy within less than 0.01 pound in weight while eliminating all necessity for reading of the scale and like manual operations capable of giving rise to error.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A power operated scale adapted for the rapid weighing of a series of loads and having a weighing mechanism including a lever adapted to occupy a zero position and to be deflected away from said position in proportion to the weight of a load applied to the scale, comprising a shaft adapted to be displaced from a reference position to a balance position corresponding to the load on the scale, a reversible drive motor having a driving connection with said shaft, control means having a neutral position with respect to said lever in the balance position of said scale and actuated in response to deflection of said lever from said neutral position for selectively controlling the energization of said motor to cause displacement of said shaft in an amount proportional to the load on the scale and in the direction to restore said neutral position thereof, means establishing selectively usable power circuits for said motor to cause relatively high and low speed operation thereof in both directions, and means responsive to removal of the load from said scale to effect energizing of said motor through said low speed circuit in the direction to cause return of said shaft to said reference position at said low speed.

2. A power operated scale adapted for the rapid weighing of a series of loads and having a weighing mechanism including a lever adapted to occupy a zero position and to be deflected away from said position in proportion to the weight of a load applied to the scale, comprising a shaft adapted to be displaced from a reference position to a balance position corresponding to the load on the scale, a reversible drive motor having a driving connection with said shaft, control means having a neutral position with respect to said lever in the balance position of said scale and actuated in response to deflection of said lever from said neutral position for selectively controlling the energization of said motor to cause displacement of said shaft in an amount proportional to the load on the scale and in the direction to restore said neutral position thereof, means establishing selectively usable power circuits for said motor to cause relatively high and low speed operation thereof in both directions, means responsive to removal of the load from said scale to effect energizing of said motor through said low speed circuit in the direction to cause return of said shaft to said reference position at said low speed, and means responsive to application of another load on said scale for effecting energizing of said motor through said high speed circuit in the direction to cause displacement of said shaft at high speed to a new balance position corresponding to said other load.

3. A power operated scale adapted for the rapid weighing of a series of loads and having a weighing mechanism including a lever adapted to occupy a zero position and to be deflected away from said position, in proportion to the weight of a load applied to the scale, comprising a shaft adapted to be displaced from a reference position to a balance position corresponding to the load on the scale, a reversible drive motor having a driving connection with said shaft, control means having a neutral position with respect to said lever in the balance position of said scale and actuated in response to deflection of said lever from said neutral position for selectively controlling the energization of said motor to cause displacement of said shaft in an amount proportional to the load on the scale and in the direction to restore said neutral position thereof, means establishing selectively usable power circuits for said motor to cause relatively high and low speed operation thereof in both directions, means responsive to application of a load on said scale with said lever in said zero position for causing said high speed operation of said motor in the direction to displace said shaft to a balance position, means responsive to approach of said shaft to within a predetermined range of said balance position for shifting said motor to said low speed operation, means for stopping said motor at said balance position of said shaft, means responsive to removal of the load from said scale to effect energizing of said motor through said low speed circuit in the direction to cause return of said shaft to said reference position at said low speed, and means responsive to application of another load on said scale for effecting energizing of said motor through said high speed circuit in the direction to cause displacement of said shaft at said high speed to a new balance position corresponding to said other load.

4. A power operated scale adapted for the rapid weighing of a series of loads and having a weighing mechanism including a lever adapted to occupy a zero position and to be deflected away from said position in proportion to the weight of a load applied to the scale, comprising a shaft adapted to be displaced from a reference position to a balance position corresponding to the load on the scale, a reversible drive motor having a driving connection with said shaft, control means having a neutral position with respect to said lever in the balance position of said scale and actuated in response to deflection of said lever from said neutral position for selectively controlling the energization of said motor to cause displacement of said shaft in an amount proportional to the load on the scale and in the direction to restore said neutral position thereof, means establishing selectively usable power circuits for said motor to cause relatively high, medium and slow speed operation thereof in both directions, means responsive to application of a load on said scale with said lever in said zero position for causing said high speed operation of said motor in the direction to displace said shaft to a balance position, means responsive to approach of said shaft to within a predetermined first range of said balance position for shifting said motor to said medium speed operation, means responsive to continued approach of said shaft to within a predetermined second and closer range of said balance position for shifting said motor to said slow speed operation, means for stopping said motor at said balance position of said shaft, means responsive to removal of the load from said scale to effect energizing of said motor through said medium speed circuit in the direction to cause return of said shaft to said reference position at said medium speed, and means responsive to application of another load on said scale for effecting energizing of said motor through said high speed circuit in the direction to cause displacement of said shaft at said high speed to a new balance position corresponding to said other load.

5. A power operated scale adapted for the rapid weighing of a series of loads and having a platter and weighing mechanism including a lever adapted to occupy a zero position and to be deflected away from said position in proportion to the weight of a load applied to said platter, comprising a shaft adapted to be displaced from a reference position to a position corresponding to the weight on said platter, a reversible drive motor having a driving connection with said shaft, control means having a neutral position with respect to said lever in the balance position of said scale and actuated in response to deflection of said lever from said neutral position for selectively controlling the energization of said motor to cause displacement of said shaft in an amount proportional to the load on the scale and in the direction to restore said neutral position thereof, means establishing selectively usable power circuits for said motor to cause relatively high and low speed operation thereof in both directions, a switch located for operation by said platter when there is no load thereon, and means controlled by said switch in said operated position thereof for blocking said high speed circuit to cause return of said shaft to said reference position thereof at said low speed in response to removal of the load from said platter.

6. A power operated scale adapted for the rapid weighing of a series of loads and having a platter and weighing mechanism including a lever adapted to occupy a zero position and to be deflected away from said position in proportion to the weight of a load applied to said platter, comprising a shaft adapted to be displaced from a reference position to a position corresponding to the weight on said platter, a reversible drive motor having a driving connection with said shaft, control means having a neutral position with respect to said lever in the balance position of said scale and actuated in response to deflection of said lever from said neutral position for selectively controlling the energization of said motor to cause displacement of said shaft in an amount proportional to the load on the scale and in the direction to restore said neutral position thereof, means establishing selectively usable power circuits for said motor to cause relatively high and low speed operation thereof in both directions, a switch located for operation by said platter when there is no load thereon, means controlled by said switch in said operated position thereof for blocking said high speed circuit to cause return of said shaft to said reference position thereof at said low speed in response to removal of the load from said platter, and means responsive to application of another load on said platter during said low speed return movement of said shaft for causing said control means to effect energizing of said motor through said high speed circuit in the direction to cause displacement of said shaft at said high speed to a new balance position corresponding to said other load.

7. A power operated scale adapted for the rapid weighing of a series of loads and having a platter and a weighing mechanism including a lever adapted to occupy a zero position and to be deflected away from said position in proportion to the weight of a load applied to said platter, comprising a shaft adapted to be displaced from a reference position to a balance position corresponding to the load on said platter, a reversible drive motor having a driving connection with said shaft, control means having a neutral position with respect to said lever in the balance position of said scale and actuated in response to deflection of said lever from said neutral position for selectively controlling the energization of said motor to cause displacement of said shaft in an amount proportional to the load on the scale and in the direction to restore said neutral position thereof, means establishing selectively usable power circuits for said motor to cause relatively high, medium and slow speed operation thereof in both directions, means responsive to application of a load on said scale with said lever in said zero position for causing said high speed operation of said motor in the direction to displace said shaft to balance position, means responsive to approach of said shaft to within a predetermined first range of said balance position for shifting said motor to said medium speed operation, means responsive to continued approach of said shaft to within a predetermined second and closer range of said balance position for shifting said motor to said slow speed operation, means for stopping said motor at said balance position of said shaft, a switch located for operation by said platter when there is no load thereon, means controlled by said switch in said operated position thereof for blocking said high speed circuit and causing return movement of said shaft to said reference position thereof at said medim speed in response to removal of the load from said scale, and means responsive to application of another load on said scale during medium speed return movement of said shaft for causing said control means to effect energizing of said motor through said high speed circuit in the direction to cause displacement of said shaft at said high speed to a new balance position corresponding to said other load.

References Cited in the file of this patent

UNITED STATES PATENTS

| | | |
|---|---|---|
| 1,952,171 | Jones | Mar. 27, 1934 |
| 2,040,073 | Brendel | May 12, 1936 |
| 2,346,117 | Stabler | Apr. 4, 1944 |
| 2,622,868 | Yeasting | Dec. 23, 1952 |
| 2,728,885 | Cooper et al. | Dec. 27, 1955 |